United States Patent Office 3,635,946
Patented Jan. 18, 1972

3,635,946
N₁-(2'-FURANIDYL)-DERIVATIVES OF
5-SUBSTITUTED URACILS
Solomon Aronovich Giller, Ul. Pernavas 10, kv. 76;
Regina Abramovna Zhuk, Ul. Gorkogo 77–20; Marger
Jurievich Lidak, Ul. Mezhotnes 37, kv. 1; and Aina
Avgustovna Zidermane, Ul. Engelsa 111a, kv. 9, all of
Riga, U.S.S.R.
No Drawing. Continuation of application Ser. No.
692,323, Dec. 21, 1967. This application July 22,
1969, Ser. No. 849,559
Int. Cl. C07d 51/52
U.S. Cl. 260—211.5 R                               1 Claim

ABSTRACT OF THE DISCLOSURE

Novel compounds of the formula

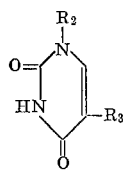

wherein $R_2$ is a 2-furanidyl group and $R_3$ is methyl, trihalomethyl or halogen are prepared by reacting the mercury or bis-trimethylsilyl derivatives of the corresponding uracils with 2-chlorofuranidine. The 2-pyranidyl derivative is prepared if 2-chloropyranidine is used instead. The compounds are useful in treating sarcoma 180 and Walker carcinosarcoma in mice.

---

This application is a continuation of application Ser. No. 692,323, filed Dec. 21, 1967 and now abandoned.

This invention relates to chemical compounds and more particularly to 5-substituted uracils of the formula

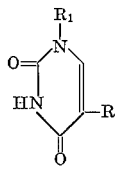

and the corresponding alkali metal salts.

From the number of compounds contemplated by the above formula, only those derivatives in which $R_1$ is pyranidyl and R is methyl, bromine or iodine have been known (C. W. Noell, C. C. Cheng, Journal of Heterocyclic Chemistry, 3 (1), 5 (1966)).

The present invention is directed by new compounds of the type shown above and more particularly to $N_1$-(2-furanidyl)-derivatives of 5-substituted uracils having the formula

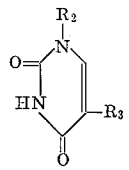

wherein $R_2$ is a 2-furanidyl group and $R_3$ is a radical selected from the group consisting of methyl, trihalomethyl and halogen; and the alkali metal salts thereof.

Our investigations have shown that the obtained new compounds and their salts are antimetabolites and can be effectively used in treating sarcoma 180 in mice.

The present invention also relates to a method of producing compounds, including the present novel compounds, having the formula

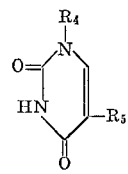

wherein $R_5$ is a radical selected from the group consisting of methyl, trihalomethyl and halogen; and
$R_4$ is a radical selected from the group consisting of α-furanidyl and α-pyranidyl.

The method comprises treating mercury or bis-trimethylsilyl derivatives of 5-substituted uracils with 2-chlorofuranidine or 2-chloropyranidine at a temperature of from —60 to +40° C.

It is advisable to carry out the reaction in an anhydrous organic solvent.

When mercury derivatives of 5-substituted uracils are used, it is preferable to use dimethylformamide as the solvent while in the reactions with bis-trimethylsilyl derivatives of 5-substituted uracils it is recommended to use toluene as the solvent.

In cases when the above mentioned solvents are used it is advisable to carry out the reaction at a temperature from —20° to —30° C.

In order to produce the alkali metal salts of $N_1$-(2'-furanidyl) and $N_1$-(2'-pyranidyl)-derivatives of 5-substituted uracils, the latter are treated with an aqueous solution of alkali, an aqueous solution of an alkali metal salt of a weak acid, or with an alcohol solution of alkali metal alcoholates.

The production of $N_1$-(2'-furanidyl)- and $N_1$-(2'-pyranidyl)-derivatives of 5-substituted uracils is carried out in the following way.

The starting mercury or bis-trimethylsilyl derivatives of 5-substituted uracils is cooled in a stream of dry nitrogen, and while being vigorously stirred, 2-chlorofuranidine or 2-chloropyranidine is added. In this reaction, the bis-trimethylsilyl derivatives obtained by silylation of 5-substituted uracils can be used as pure products or as non-purified oily substances. Stirring is continued over 3–4 hrs. while the temperature is gradually increased to room temperature. The temperature at which the reaction is carried out is determined by the reactivity of the initial derivative of the 5-substituted uracil. When the temperature is too low, the rate of reaction decreases sharply, while at high temperatures, decomposition of the starting compounds, 2-chlorofuranidine and 2-chloropyranidine occurs.

In using mercury derivatives of 5-substituted uracils and after the reaction is completed, ethanol is added to the reaction mixture; the latter is heated to 25–30° C., and hydrogen sulfide is passed through the mixture to precipitate mercuric sulfide. The precipitate is sucked off and the solution is evaporated to dryness. The dry residue is recrystallized from chloroform.

In using bis-trimethylsilyl derivatives of 5-substituted uracils after the reaction is completed, aqueous ethanol is added to the reaction mixture and the latter is stirred for 2 hrs. The precipitate is sucked off, washed with ethanol and recrystallized from chloroform.

It is, however, advisable to perform these reactions in an anhydrous organic solvent.

In the case of mercury derivatives of 5-substituted uracils after the completion of the reaction the solvent is vacuum evaporated at the lowest possible temperature, then dry acetone is added and also vacuum evaporated.

The residue is readily crystallized, sucked off, washed with ethanol and air dried.

If bis-trimethylsilyl derivatives of 5-substituted uracils are used, the procedure remains the same.

In order to obtain the alkali metal salts of $N_1$-(2'-furanidyl) and $N_1$-(2'-pyranidyl) derivatives of 5-substituted uracils, the latter are treated with an aqueous solution of alkali or an aqueous solution of an alkali metal salt of a weak acid, or an alcohol solution of an alkali metal alcoholate.

Thus the solutions of the above indicated compounds are obtained. In order to produce metal salt solutions suitable for injections, the process is carried out under aseptic conditions (in the cases where aqueous solutions of alkalies or of alkali metal salts of weak acids are used).

If necessary, the alkali metal salts of $N_1$-(2'-furanidyl)- and $N_1$-(2'-pyranidyl)-derivatives of 5-substituted uracils can be isolated from said solutions in crystalline form by evaporating the solutions in vacuum under mild conditions (at the lowest possible temperature).

The new substances synthesized by the present method possess an inhibiting effect on sarcoma 180 and they are characterized by a low degree of toxicity.

Thus, $N_1$-(2'-furanidyl)-5-fluorouracil has an inhibiting effect on sarcoma 180 and Walker carcinosarcoma. At the same time this compound is approximately six times less toxic than 5-fluorouracil. Acute toxicity has been tested on mice weighing from 18 to 20 g. upon a single intraabdominal injection of the preparation. The medial lethal dose ($LD_{50}$) calculated with the aid of probit analysis according to the method of Litchfield and Wilcoxon was found to be 750 mg./kg. as against 130 mg./kg. for 5-fluorouracil.

The advantage of the alkali metal salts of $N_1$-(2'-furanidyl)- and $N_1$-(2'-pyranidyl)-derivatives of 5-substituted uracils as compared with the basic compounds is their good solubility in water. Thus a 5% aqueous solution of sodium salt of $N_1$-(2'-furanidyl)-5-fluorouracil is used for intravenous injections.

For a better understanding of the present invention, the following examples for producing $N_1$-(2'-furanidyl)- and $N_1$-(2'-pyranidyl)-derivatives of 5-substituted uracils and their alkali metal salts are presented by way of illustration.

EXAMPLE 1

A vigorously stirred reaction mixture consisting of 32.87 g. (0.1 mole) of 5-fluorouracilmercury, 100 ml. of dimethylformamide and 50 ml. of toluene is dried by azeotropic distillation of toluene. It is then cooled to −40° C. in a stream of dry nitrogen, and a solution of 21.3 g. (0.2 mole) of 2-chlorofuranidin in 20 ml. of dried dimethylformamide is gradually added to the stirred mixture, the temperature being maintained between −40° and −30° C. After completion of the reaction (which is marked by complete dissolution of the starting 5-fluorouracilmercury) i.e. after about 3–4 hrs., 60–80 ml. of the solvent are distilled off in vacuo at a bath temperature not exceeding 35° C.; 50–70 ml. of dry acetone are then added and also vacuum distilled. The residue is easily crystallized. It is collected, washed three times with small quantities of ethanol—10 ml. each—and air-dried. 12.2 g. of $N_1$-(2'-furanidyl)-5-fluorouracil are obtained in the form of white crystalline solids; M.P. 160–162° C. Additional treatment of the mother liquor yields 3.0 g. more of the product. Yield: 75% of theory, based on the starting 5-fluorouracilmercury.

After recrystallization from ethanol—14.3 g. of $N_1$-(2'-furanidyl)-5-fluorouracil are obtained; M.P. 164–165° C.

$C_8H_9O_3N_2F$.—Found (percent): C, 48.34; H, 4.73; N, 14.27. Calcd. (percent): C, 47.99; H, 4.50; N, 14.00.

EXAMPLE 2

The process is performed as described in Example 1. Starting with 34.51 g. (0.1 mole) of 5-chlorouracilmercury and 21.3 g. (0.2 mole) of 2-chlorofuranidin, at a temperature −20—−15° C. 17.3 g. (80% of theory based on the initial 5-chlorouracilmercury) of $N_1$-(2'-furanidyl)-5-chlorouracil in the form of a white crystalline substance is obtained. The end product is recrystallized from ethanol, M.P. 198° C. (decomp.).

$C_8H_9O_3N_2Cl$.—Found (percent): C, 44.25; H, 4.31; N, 13.67. Calcd. (percent): C, 44.40; H, 4.14; N, 12.93.

EXAMPLE 3

The process is performed as described in Example 1. Starting with 38.96 g. (0.1 mole) of 5-bromouracilmercury and 21.3 g. (0.2 mole) of 2-chlorofuranidin at a temperature of −25—−20° C. 15.7 g. (60% of theory based on the initial 5-bromouracilmercury) of $N_1$-(2'-furanidyl)-5-bromouracil in the form of a white crystalline substance is obtained. The product is recrystallized from ethanol, M.P. 196° C. (decomp.).

$C_8H_9O_3N_2Br$.—Found (percent): C, 36.10; H, 3.68; N, 11.11. Calcd. (percent): C, 36.76; H, 3.44; N, 10.73.

EXAMPLE 4

The process is performed as described in Example 1, but starting from 43.7 g. (0.1 mole) of 5-iodouracilmercury and reacting it with 21.3 g. (0.2 mole) of 2-chlorofuranidin at temperature −25°—−15° 17.6 g. of $N_1$-(2'-furanidyl)-5-iodouracil in the form of slightly yellow crystals have been obtained, i.e. 53% of theory based on the starting 5-iodouracilmercury; M.P. 174° (decomp.) recrystallized from ethanol.

$C_8H_9O_3N_2I$.—Found (percent): C, 31.00; H, 3.27; N, 9.41. Calcd. (percent): C, 31.15; H, 2.92; N, 9.25.

EXAMPLE 5

The process is performed as described in Example 1.

Starting from 32.5 g. (0.1 mole) of monothyminylmercury and 21.3 g. (0.2 mole) of 2-chlorofuranidin at a temperature from 0° to +10° C. and after dimethylformamide is removed, 15.2 g. of a crystalline product is obtained. This product is dissolved in ethanol and at a temperature of about 30° C., hydrogen sulfide is passed through the solution in order to precipitate the impurities of mercuric chloride.

The precipitated mercuric sulfide is sucked off and washed with ethanol. The ethanol solution is then vacuum evaporated to dryness and the residue recrystallized from chloroform. 9.4 g. (48% of theory) $N_1$-(2'-furanidyl)-thymine in the form of a white crystalline substance is obtained, M.P. 176.5–178° C.

$C_9H_{12}O_3N_2$.—Found (percent): C, 55.40; H, 6.30; N, 14.71. Calcd. (percent): C, 55.09; H, 6.17; N, 14.28.

EXAMPLE 6

The process is performed as in Example 1. Starting with 18.0 g. (0.1 mole) of 5-trifluoromethylmercury and 21.3 g. (0.2 mole) of 2-chlorofuranidin at a temperature of −30 to −25° C. 17.5 g. (70% of theory) of $N_1$-(2'-furanidyl)-5-trifluoromethyluracil in the form of a white crystalline substance is obtained. The end product is recrystallized from ethanol, M.P. 182–184° C. (decomp.).

$C_9H_9O_3N_2F_3$.—Found (percent): C, 43.31; H, 3.78; N 10.95. Calcd. (percent): C, 43.20; H, 3.63; N, 11.20.

EXAMPLE 7

The process is performed as in Example 1. Starting from 32.87 g. (0.1 mole) 5-fluorouracilmercury and 24.81 g. (0.2 mole) 2-chloropyranidin at a temperature of −25—−20° 15.4 g. (72% of theory) $N_1$-(2'-pyranidyl)-5-fluorouracil in the form of a white crystalline substance is obtained. The end product is recrystallized from ethanol, M.P. 170–172° C. (decomp.).

$C_9H_{11}O_3N_2F$.—Found (percent): C, 50.12; H, 5.10; N, 13.21. Calcd. (percent): C, 50.46; H, 5.18; N, 13.08.

EXAMPLE 8

13 g. (0.1 mole) of 5-fluorouracil and 21.7 g. (0.2 mole) of chlorotrimethylsilane in the presence of 20.2 g.

of triethylamine are stirred for 7 hrs. at room temperature in 300 ml. of dry toluene. The precipitated triethylamine hydrochloride is filtered off in a dry nitrogen atmosphere, washed with toluene and the filtrate is concentrated by vacuum distillation as most of the toluene becomes evaporated. The resultant oily solution is then cooled to −30° in a dry nitrogen atmosphere and 10.6 g. (0.1 mole) of 2-chlorofuranidin are added while the mixture is vigorously stirred. Stirring is continued for 2 hrs. and during this time the temperature is allowed gradually to rise to room temperature. Then 20 ml. of aqueous ethanol are added and the stirring continues for another 2 hours. The precipitated solid is filtered off, washed with 20 ml. of ethanol and extracted with chloroform. 2.6 g. (20% of the theory) 5-fluorouracil remain as a non-dissolved solid. Out of the chloroform solution 10.0 g. (50% of the theory, based on the starting 5-fluorouracil) are obtained in the form of a white crystalline solid, M.P. 164–165°.

$C_8H_9O_3N_2F$.—Found (percent): C, 48.25; H, 4.62; N, 14.15. Calcd. (percent): C, 47.99; H, 4.50; N, 14.00.

EXAMPLE 9

13 g. (0.1 mole) of 5-fluorouracil, 1 ml. of chlorotrimethylsilane and 60 ml. of hexamethyldisilazane are heated for 4 hours at a temperature of 150–170° C. The excess of hexamethylsilazane is vacuum distilled at 1 mm. Hg (temperature of the bath is not higher than 50–60° C.). The oily residue is cooled in an atmosphere of dry nitrogen to −30° C. 10.6 g. (0.1 mole) of 2-chlorofuranidine are added under vigorous stirring. The stirring is continued during 2 hours while the temperature rises gradually up to room temperature. Then 20 ml. of aqueous ethanol are added and the stirring is continued for 2 hours more. The precipitate is sucked off, washed in 20 ml. of ethanol and extracted with 100 ml. of a mixture of chloroform and ether (3:1). 2.0 g. of 5-fluorouracil (15% of theory) remain as a non-dissolved solid. From the chloroform-ether solution 13 g. of $N_1$-(2'-furanidyl)-5-fluorouracil (65% of theory based on the initial 5-fluorouracil) are obtained as a white crystalline solid, M.P. 164.5–165.5° C.

$C_8H_9O_3N_2F$.—Found (percent): C, 48.00; H, 4.40; N, 14.20. Calcd. (percent): C, 47.99; H, 4.50; N, 14.00.

EXAMPLE 10

To 14 g. (0.25 mole) of potassium hydroxide in 1000 ml. of distilled water at a temperature of 40° C., are added 50 g. (0.25 mole) of $N_1$-(2'-furanidyl)-5-fluorouracil; the mixture is stirred till complete dissolution of the components and filtered. Under aseptic conditions a solution of the potassium salt of $N_1$-(2'-furanidyl)-5-fluorouracil is obtained ready to fill the ampules.

EXAMPLE 11

Under aseptic conditions 23 g. (0.27 mole) of sodium bicarbonate are dissolved in 1000 ml. of distilled water; the solution is heated to 40° C., and 50 g. (0.25 mole) of $N_1$-(2'-furanidyl)-5-fluorouracil are added while stirring. The stirring is continued until complete dissolution of the components. The solution is then passed through germproof filters.

A solution of the sodium salt of $N_1$-(2'-furanidyl)-5-fluorouracil ready to fill ampules, is obtained.

EXAMPLE 12

5 g. (0.025 mole) of $N_1$-(2'-furanidyl)-5-fluorouracil are dissolved while stirring and heating in 50 ml. of absolute ethanol and a solution of sodium ethylate is added (0.57 g. of sodium (0.025 g.-at.) in 15 ml. of absolute ethanol). The obtained solution is vacuum evaporated at a temperature of 20–25° and a residue of the sodium salt of $N_1$-(2'-furanidyl)-5-fluorouracil is formed. The salt is filtered, washed in 10 ml. of absolute ethanol and vacuum dried at 20–25° C. Yield of the sodium salt of $N_1$-(2'-furanidyl)-5-fluorouracil is 5.5 g. (90% of theory).

$C_8H_8O_3N_2FNa$.—Found (percent): C, 42.90; H, 3.52; N, 21.73. Calcd. (percent): C, 43.05; H, 3.61; N, 21.51.

What is claimed is:

1. $N_1$-(2'-furanidyl)-5-fluorouracil and alkali metal salts thereof.

References Cited

UNITED STATES PATENTS

| | | | |
|---|---|---|---|
| 3,309,359 | 3/1967 | Duschinsky et al. | 260—211.5 |
| 3,328,388 | 6/1967 | Shen et al. | 260—211.5 |
| 3,346,561 | 10/1967 | Boxer | 260—211.5 |
| 3,352,849 | 11/1967 | Shen et al. | 260—211.5 |
| 3,354,160 | 11/1967 | Duschinsky et al. | 260—211.5 |

OTHER REFERENCES

Noell et al., "Jour. of Heterocyclic Chem.," vol. 3, 1966, pp. 5–8.

LEWIS GOTTS, Primary Examiner

J. R. BROWN, Assistant Examiner

U.S. Cl. X.R.

424—180